United States Patent
Stanesti et al.

(10) Patent No.: US 6,879,134 B2
(45) Date of Patent: Apr. 12, 2005

(54) SELECTOR CIRCUIT FOR POWER MANAGEMENT IN MULTIPLE BATTERY SYSTEMS

(75) Inventors: Vlad Popescu Stanesti, San Jose, CA (US); Marian Niculae, San Jose, CA (US); Constantin Bucur, Santa Clara, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 10/649,394

(22) Filed: Aug. 27, 2003

(65) Prior Publication Data

US 2004/0155627 A1 Aug. 12, 2004

Related U.S. Application Data

(63) Continuation-in-part of application No. 10/364,228, filed on Feb. 11, 2003.
(60) Provisional application No. 60/484,635, filed on Jul. 3, 2003.

(51) Int. Cl.[7] .................................................. H02J 7/00
(52) U.S. Cl. ....................................................... 320/135
(58) Field of Search ................................ 320/135, 117, 320/134, 145; 361/93.1

(56) References Cited

U.S. PATENT DOCUMENTS

| | | | |
|---|---|---|---|
| 4,621,313 A | 11/1986 | Kiteley | 363/49 |
| 5,698,964 A | 12/1997 | Kates et al. | 320/164 |
| 5,723,970 A | 3/1998 | Bell | 320/140 |
| 5,903,764 A | 5/1999 | Shyr et al. | 713/300 |
| 5,912,549 A | 6/1999 | Farrington et al. | 323/207 |
| 5,920,475 A | 7/1999 | Boylan et al. | 363/127 |
| 6,130,813 A * | 10/2000 | Kates et al. | 361/93.1 |
| 6,184,660 B1 | 2/2001 | Hatular | 320/141 |
| 6,268,711 B1 * | 7/2001 | Bearfield | 320/117 |
| 6,351,110 B1 | 2/2002 | Pappalardo et al. | 323/285 |
| 6,369,561 B1 | 4/2002 | Pappalardo et al. | 323/285 |
| 6,396,716 B1 | 5/2002 | Liu et al. | 363/17 |
| 6,445,164 B2 * | 9/2002 | Kitagawa | 320/134 |
| 6,498,461 B1 * | 12/2002 | Bucur | 320/145 |

* cited by examiner

Primary Examiner—Pia Tibbits
(74) Attorney, Agent, or Firm—Grossman, Tucker, Perreault & Pfelger PLLC

(57) ABSTRACT

A selector circuit configured to select among a DC power source and a plurality of batteries for an electronic device. The selector circuit is responsive to an output signal from an associated power management unit. The selector circuit is further configured to permit parallel operation of two or more of the batteries. The selector circuit may further act to independently verify power conditions and override instructions from the PMU in certain instances to enhance power supply safety and battery life such as by preventing inter battery current flow from a higher potential battery to a lower potential battery coupled in parallel. A power supply block including the selector circuit and an electronic device including the power supply block is also provided. The selector circuit may be integrated with a charging circuit on one integrated circuit.

23 Claims, 11 Drawing Sheets

FIG. 5

| | USE SIGNALS INDICATE BATTERY A | | USE SIGNALS INDICATE BATTERY B | | USE SIGNALS INDICATE BATTERY IN PARALLEL | | USE SIGNALS INDICATE BATTERY A AND B | | | | USE SIGNALS INDICATE NEITHER BATTERY A OR B |
|---|---|---|---|---|---|---|---|---|---|---|---|
| | 502 | 504 | 506 | 508 | 510 | 512 | 514 | 516 | 518 | 520 | 522 |
| SIGNAL STATES | | | | | | | | | | | |
| USE_A | LOW | LOW | HIGH | HIGH | LOW | LOW | LOW | LOW | LOW | LOW | HIGH |
| USE_B | HIGH | HIGH | LOW | LOW | LOW | LOW | LOW | LOW | LOW | LOW | HIGH |
| LOWER VOLTAGE BATTERY | X | X | X | X | X | X | A | A | B | B | X |
| CHARGING CURRENT SIGNAL | | | | | LOW | HIGH | LOW | HIGH | LOW | HIGH | |
| VINP1 | LOW | HIGH | LOW | HIGH | HIGH | HIGH | HIGH | HIGH | HIGH | HIGH | LOW |
| CHGEN | HIGH | HIGH | HIGH | HIGH | HIGH | HIGH | LOW | LOW | LOW | LOW | LOW |
| PBUE | HIGH | HIGH | HIGH | HIGH | HIGH | HIGH | LOW | LOW | LOW | LOW | LOW |
| SWITCH STATES | | | | | | | | | | | |
| SW1 | ON | ON | ON | ON | ON | ON | ON | ON | ON | ON | ON |
| SW2 | OFF | OFF | OFF | OFF | OFF | OFF | OFF | OFF | OFF | OFF | OFF |
| SW3 | ON | ON | OFF | OFF | ON | ON | ON | ON | OFF | OFF | OFF |
| SW4 | OFF | OFF | ON | ON | ON | ON | OFF | OFF | ON | ON | OFF |
| SW5 | OFF | OFF | OFF | OFF | OFF | OFF | OFF | ON | ON | OFF | OFF |
| SW6 | OFF | OFF | ON | ON | OFF | OFF | ON | OFF | OFF | ON | OFF |

500

| SUPPLY MODE | NBSSM1 | NBSSM1 | NBSSM2 |
|---|---|---|---|
| TARGETED SUPPLY BATTERY | A | B | A+B |
| VINP1 | HIGH | HIGH | HIGH |
| VINP2 | LOW | LOW | HIGH |
| BATTCOMP | X | X | HIGH |
| PBUE | LOW | LOW | HIGH |
| SW1 | OFF | OFF | OFF |
| SW2 | ON | ON | ON |
| SW3 | ON | OFF | ON |
| SW4 | ON | OFF | ON |
| SW5 | OFF | ON | ON |
| SW6 | OFF | ON | ON |

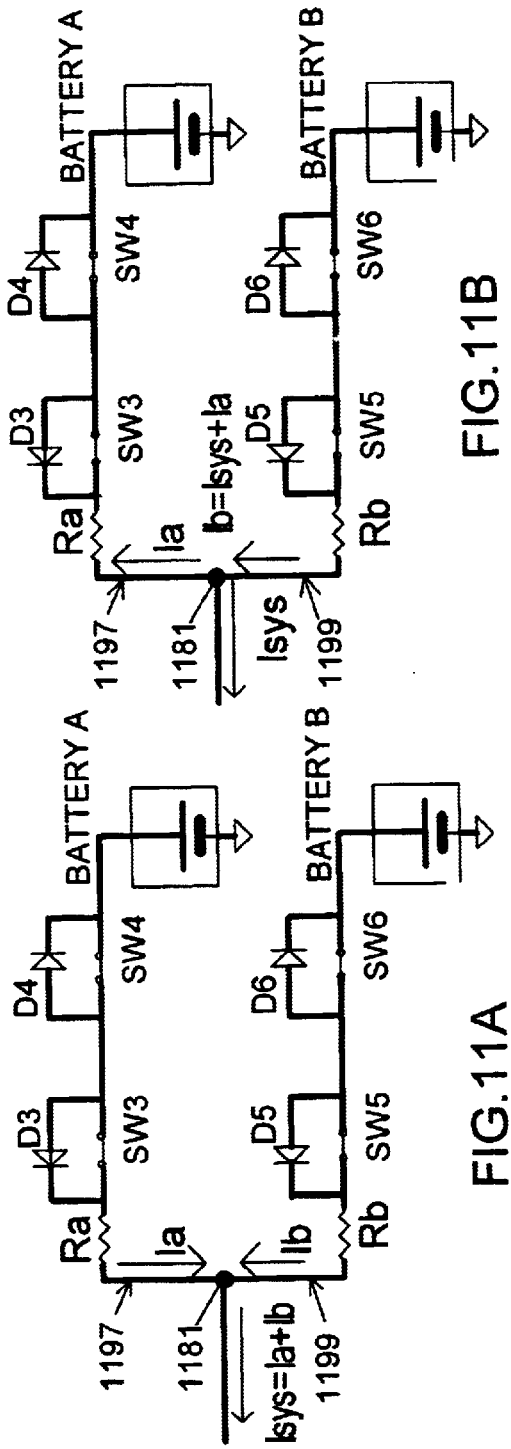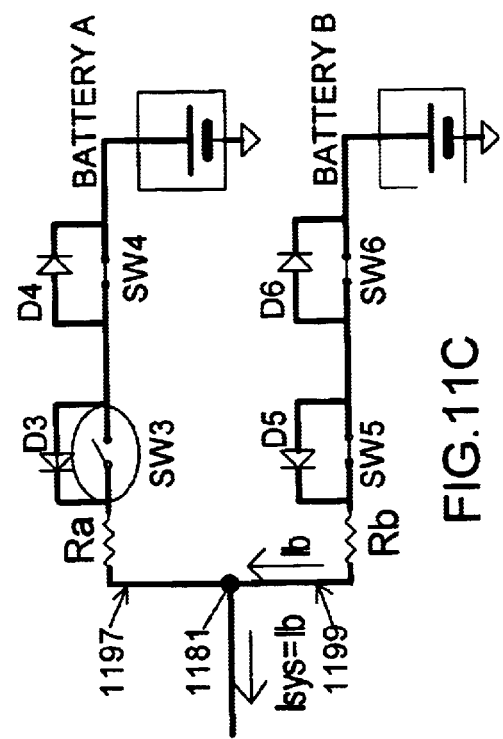
FIG.11A
FIG.11B
FIG.11C

SELECTOR CIRCUIT FOR POWER MANAGEMENT IN MULTIPLE BATTERY SYSTEMS

CROSS REFERENCE TO RELATED APPLICATIONS

The present application is a continuation-in-part application of U.S. Nonprovisional application Ser. No. 10/364,228 filed Feb. 11, 2003, the teachings of which are incorporated herein by reference and claims the benefit of U.S. Provisional Application No. 60/484,635 filed Jul. 3, 2003, the teachings of which are also incorporated herein by reference.

FIELD OF THE INVENTION

The present invention relates to selector circuits and in particular to selector circuits for use with multiple battery systems.

BACKGROUND OF THE INVENTION

Selector circuits are typically utilized in a power supply block for various electronic devices. Such selector circuits are generally designed to select between a DC power source, e.g., an AC/DC adapter, and a rechargeable battery. In addition, in various electronic devices like a laptop computer, such selector circuits are typically controlled via control signals communicated via a System Management Bus (SMBus) according to a specified protocol. In addition, such selector circuits typically cannot independently ascertain, correct, and notify other components in the power supply block of a power crises condition. In addition, such selector circuits are not configured to accept control signals from an associated host power management unit.

Accordingly, there is a need in the art for a selector circuit for overcoming the above deficiencies in the prior art.

BRIEF SUMMARY OF THE INVENTION

In one embodiment, a power supply system consistent with the invention includes: a first path configured to be coupled to a first battery; a second path configured to be coupled to a second battery, the first path and the second path coupled to a common node; a first switch and a second switch coupled to the first path and configured to allow selective coupling of the first battery to a load for discharging the first battery; a third switch and a fourth switch coupled to the second path and configured to allow selective coupling of the second battery to the load for discharging the second battery; and a selector circuit configured to close the first, second, third, and fourth switch to allow discharging of the first battery and the second battery in parallel if a first discharge current level from the first battery is greater than a first discharge threshold level and a second discharge current level from the second battery is greater than a second discharge threshold level.

In another embodiment, an electronic device is provided. The electronic device includes: a first path configured to be coupled to a first battery; a second path configured to be coupled to a second battery, the first path and the second path coupled to a common node; a first switch and a second switch coupled to the first path and configured to allow selective coupling of the first battery to a system of the electronic device for discharging the first battery; a third switch and a fourth switch coupled to the second path and configured to allow selective coupling of the second battery to the system for discharging the second battery; and a selector circuit configured to close the first, second, third, and fourth switch to allow discharging of the first battery and the second battery in parallel if a first discharge current level from the first battery is greater than a first discharge threshold level and a second discharge current level from the second battery is greater than a second discharge threshold level.

In yet another embodiment consistent with the invention, a method of ensuring safe operation of batteries in parallel is provided. The method includes: receiving a control signal from an associated power management unit representative of a desired parallel coupling of at least a first battery and a second battery to a common node; receiving a first current signal representative of a first current level along a first path coupled between the first battery and the common node; receiving a second current signal representative of a second current level along a second path coupled between the second battery and the common node; comparing the first current signal to a first threshold current level and the second current signal to a second threshold current level; and coupling the first battery and second battery in parallel to the common node if the first current signal is greater than the first threshold current level and the second current signal is greater than the second threshold current level.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 5 is an exemplary table illustrating how the selector circuit drives various switches to ON and OFF states dependent on various input signals when the electronic device is powered by a DC power source;

FIGS. 11A to 11C are exemplary circuit diagrams illustrating how the selector circuit of FIG. 7 detects a low voltage battery condition and prevents inter battery current flow.

DETAILED DESCRIPTION

Figure 1:
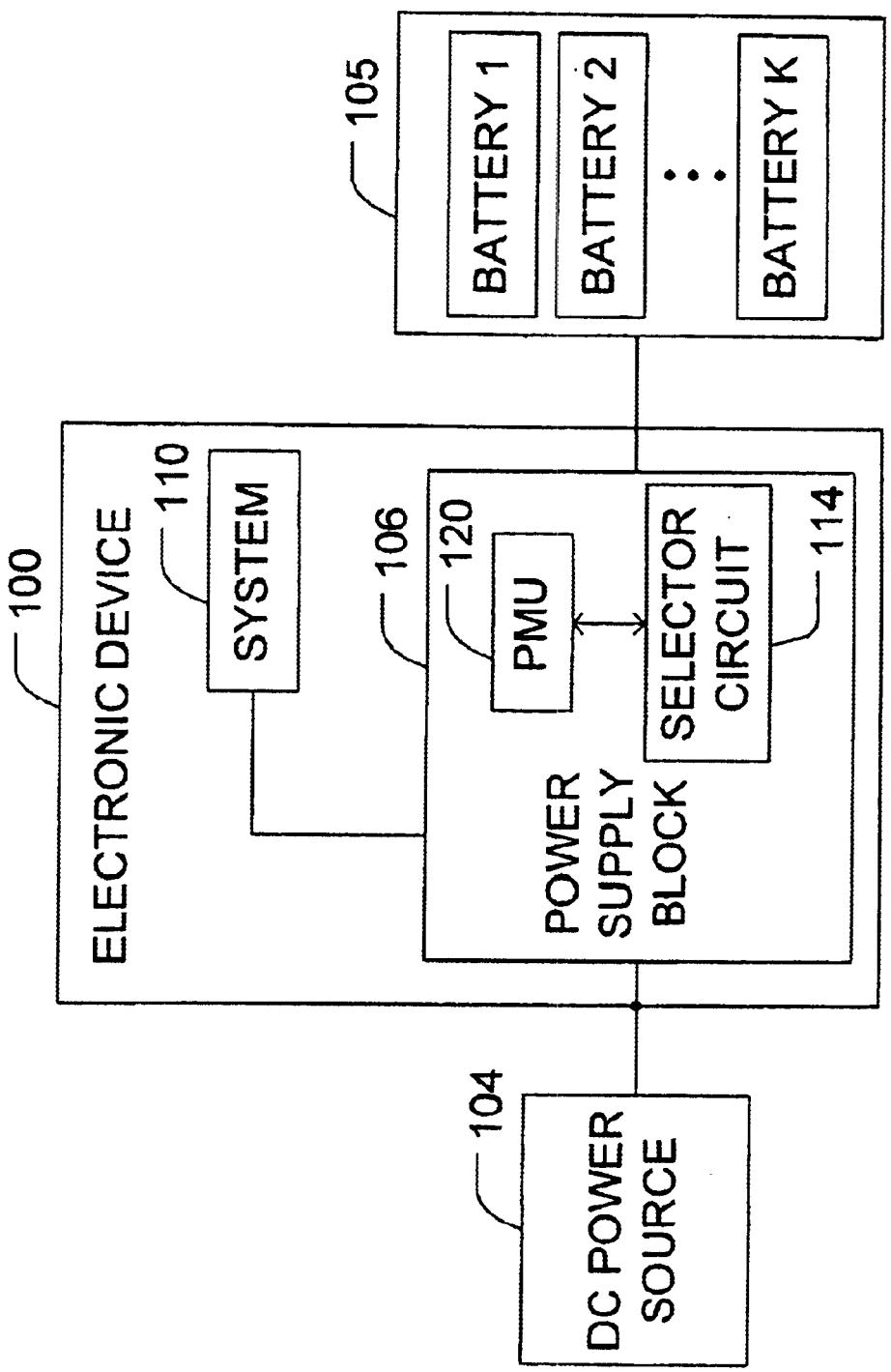
FIG. 1 is a simplified high level block diagram of an electronic device with a power supply block having a selector circuit consistent with the invention that makes a selection in response to an output signal from a power management unit (PMU)

Turning to FIG. 1, a simplified block diagram of an electronic device 100 capable of being powered from any number of power sources 104, 105 is illustrated. Such power sources may include a plurality of batteries 105 and a DC power source 104. The batteries 105 may further be rechargeable batteries of various types such as lithium-ion, nickel-cadmium, nickel-metal hydride batteries, or the like. The electronic device 100 may be any variety of devices known in the art such as portable electronic devices (laptop computers, cell phones, pagers, personal digital assistants, camcorders, digital cameras, radio cassette players, and the like), an electric powered vehicle, power tools, etc. that may be powered from either power source 104, 105 in various instances.

If the electronic device 100 is a laptop computer it would include a variety of components known to those skilled in the art which are not illustrated in FIG. 1. For example, the laptop may include an input device for inputting data to the laptop, a central processing unit (CPU) or processor, for example a Pentium processor available from Intel Corporation, for executing instructions and controlling operation of the laptop, and an output device, e.g., a LCD or speakers, for outputting data from the laptop.

To recharge batteries 105 and/or supply power to the device 100, a DC power source 104 may be coupled to the device 100. The DC power source 104 may be an AC/DC adapter which is configured to receive conventional 120 volts AC from a wall outlet and convert it to a DC output voltage. The DC power source 104 may also be a DC/DC adapter such as a "cigarette lighter" type adapter configured to plug into that type of socket. Such a DC power source 104 is illustrated in FIG. 1 as separate from the device 100, but it may be built into some devices.

The device 100 has a power supply block 106 including at least a selector circuit 114 consistent with the present invention. The power supply block 106 may also include a PMU 120 as illustrated in FIG. 1. Alternatively, the PMU 120 may also be embedded in a more complex processor of the electronic device 100. The PMU 120 is configured to run various power management routines as is known in the art. In general, the power supply block 106 includes various components to monitor, control, and direct power from each power source to each other and to the system 110 of the device 100 under various conditions. Advantageously, the selector circuit 114 consistent with the invention is configured to be responsive to at least one output signal from the PMU 120 as further detailed herein.

Figure 2:
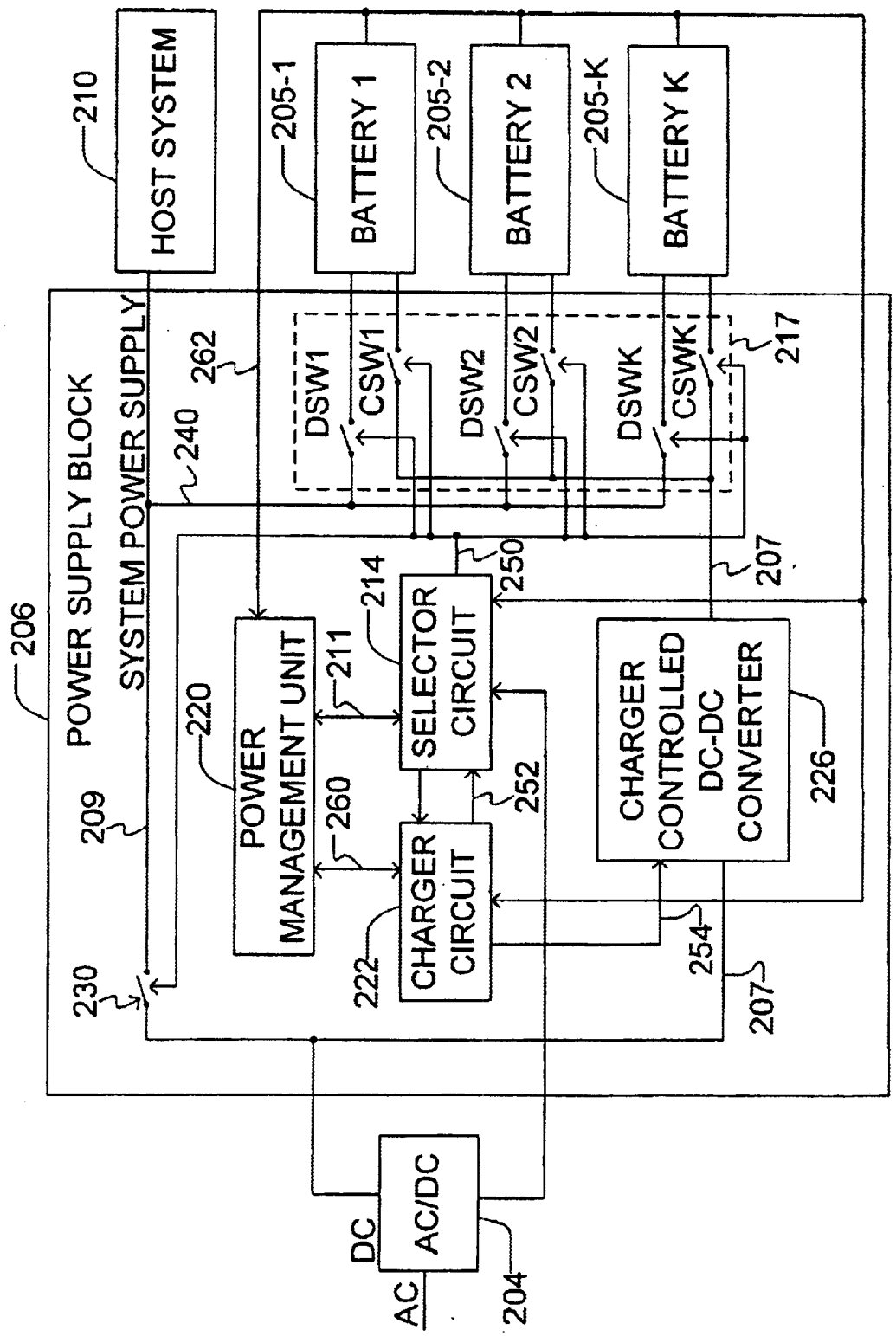
FIG. 2 is a more detailed block diagram of the power supply block portion of FIG. 1 having a selector circuit consistent with the invention for making a selection among a DC power source and a plurality of batteries.

Turning to FIG. 2, a more detailed block diagram of an exemplary power supply block 206 for a multiple battery system is illustrated. The power sources may include the DC source 204, e.g., an AC/DC converter, and any number of a plurality of batteries 205-1, 205-2, 205-k. Such batteries may also be rechargeable batteries. At any point in time, each of these power sources 204, 205-1, 205-2, 205-k may or may not be present in the system.

In general, the power supply block 206 may include a PMU 220, a charger circuit 222, a power conversion element 226, a battery switch network 217, a switch 230, a power supply path 209 from the DC power source 204 to the system 210, a power supply path 240 from the batteries 205-1, 205-2, 205-k to the system, a power supply path 207 from the DC power source 204 to the rechargeable batteries 205-1, 205-2, 205-k for recharging purposes, a selector circuit 214 consistent with the invention, and various data or communication paths. The battery switch network 217 may further contain a charge switch CSW1, CSW2, CSWk and a discharge switch DSW1, DSW2, DSWk for each associated battery 205-1, 205-2, 205-k.

The data or communication paths between the various components of the power supply block 206 may be uni-directional or bi-directional, and may conduct either analog or digital signals. The data paths may transport either command or control signals or data. The number of such data paths is strongly dependent on the particular features of the batteries 205-1, 205-2, 205-k, the charger circuit 222, the PMU 220, and those of the supply block 206 as a whole. For example, if an associated device 100 is a laptop computer, a smart charger circuit and smart batteries can communicate via a System Management Bus (SMBus) according to a specified protocol.

In general, the selector circuit 214 is responsive to various input signals from a variety of components, including the PMU 220, in the supply block 206 to provide switch control signals over path 250 to the battery switch network 217 and the switch 230 to control and direct power from each power source to each other and to the system 210 under various conditions.

For example, a particular set of input signals to the selector circuit 214 may indicate the presence of a DC power source 204 with an acceptable voltage level. In response to such an input signal, the selector circuit 214 could provide a control signal to switch 230 to close (turn ON) switch 230 ON and to open (turn OFF) discharge switches DSW1, DSW2, DSWk in the battery switch network 217. As such, power from the DC power source 204 would be provided to the system 210. Alternatively, if input signals to the selector circuit indicated the absence of a DC power source 204 or a DC power source with an unacceptable voltage level, the selector circuit 214 would provide an appropriate control signal to turn switch 230 OFF, and to turn one of the discharging switches DSW1, DSW2, DSWk of the battery switch network ON. As such, one or more of the associated batteries 205-1, 205-2, 205-k would provide power to the system 210 as long as other safety conditions were also met as will be further detailed herein.

The charge switches CSW1, CSW2, CSWk for each associated rechargeable battery 205-1, 205-2, 205-k provide a conductive path from the power supply line 207 to each associated battery when the charge switches are ON for charging purposes. The discharge switches DSW1, DSW2, DSWk provide a conductive path from each associated battery 205-1, 205-2, 205-k to the system 210 to power the system 210 from one or more batteries based on which discharge switches DSW1, DSW2, DSWk are ON.

Advantageously, at least one input signal to the selector circuit 214 is representative of an output signal from the PMU 220. Such communication between the PMU 220 and the selector circuit 214 may take place via data path 211. As understood by those skilled in the art, the PMU 220 is capable of running a host device's power management routine. The PMU 220 may provide a host set of signals to the selector circuit 214 including a signal indicating which battery 205-1, 205-2, 205-k, or combination of batteries in parallel, should be selected for charging or discharging. As further detailed herein, the selector circuit 214 is responsive to the PMU 220. However, the selector circuit 220 is further configured to have its own internal checks and can override a desired use signal from the PMU under various conditions as further detailed herein to provide for added safety and battery power savings. The charger circuit 222 is configured to communicate via data path 252 to the selector 214 and via data path 254 to a power conversion unit 226, e.g., a charger controlled DC-DC converter. The charger circuit 222 may control the providing of charging current to the batteries 205-1, 205-2, 205-k via the power supply path 207 and the power conversion unit 226.

Figure 3:
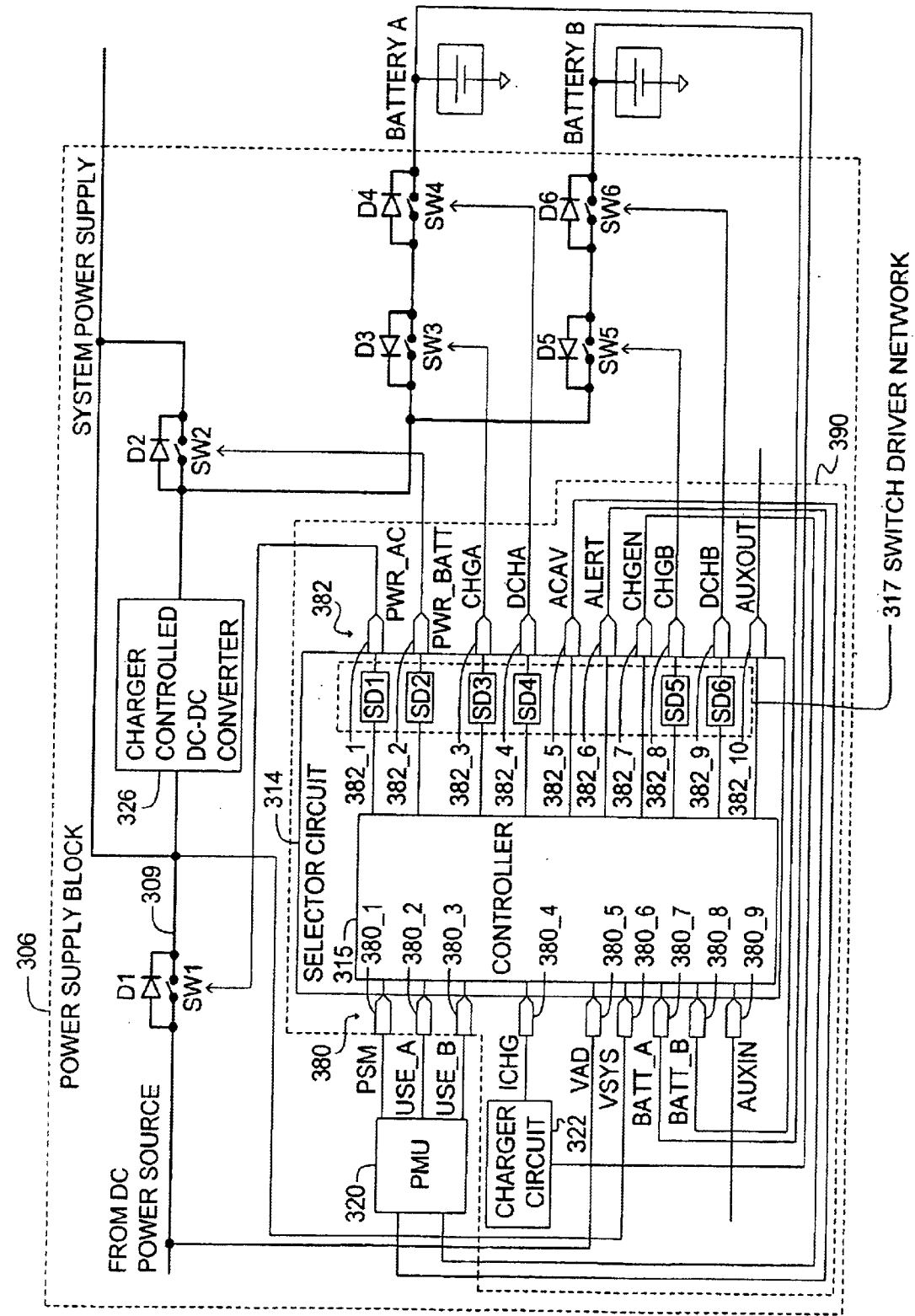
FIG. 3 is a block diagram of one exemplary embodiment of a selector circuit consistent with the invention having a controller configured to provide signals to select among a DC power source and a plurality of batteries via an associated switch driver network and associated switches.

Turning to FIG. 3, an exemplary power supply block 306 for operation in conjunction with three power sources is illustrated. The power sources include a DC power source (not illustrated) coupled to the power supply block 306 via power supply path 309, a first rechargeable Battery A, and a second rechargeable Battery B. The power supply block 306 includes a selector circuit 314 consistent with the invention and other components such as an associated PMU 320, a charger circuit 322, and a power conversion unit 326, e.g., a DC-DC converter. As earlier detailed, although the PMU 320 is illustrated as part of the supply block 306, the PMU 320 may be external to the supply block, embedded in a separate component outside of the power supply block, or the PMU's functionality may be provided by a separate component, e.g., a CPU, of the electronic device.

For clarity and simplicity, the DC source and various data connections (e.g., from the charger circuit 306 to the power conversion unit 326 and to the PMU 320, as well as those between the batteries and the PMU 320) that were previously illustrated in FIG. 2 are not illustrated in FIG. 3. Advantageously, the selector circuit 314 and the charging circuit 322 may be integrated onto one integrated circuit 390 for convenience of operation and installation.

The selector circuit 314 includes a controller 315 and a switch driver network 317 as further detailed herein. The selector circuit 314 has a variety of input terminals 380 to accept a variety of input data and control signals. Such input terminals 380 are also coupled to the controller 315. The selector circuit 314 also has a variety of output terminals 382 to provide control signals to associated switches SW1, SW2, SW3, SW4, SW5, and SW6 and to provide data to associated components of the power supply block 306. The input terminals 380 include terminals 380-1 to 380-9 to accept control and data signals labeled PSM, USE_A, USE_B, ICHG, VAD, VSYS, BATT_A, BATT-B, and AUXIN respectively. The output terminals 382 include terminals 382-1 to 382-10 to provide control and data signals labeled PWR_AC, PWR_BATT, CHGA, DCHA, ACAV, ALERT, CHGEN, CHGB, DCHB, and AUXOUT respectively. Each input terminal 380 and output terminal 382 and their associated control and data signals are generically described below.

The first input terminal 380-1 may accept a power save mode (PSM) digital input control signal from the PMU 320 representative of whether a power save mode is desired by the PMU 320. The second and third input terminals 380-2 and 380-3 may accept USE_A and USE_B control signals from the PMU 320 indicating the PMU's desired battery or combination of batteries to utilize in a given charging or discharging mode. For instance, in the embodiment of FIG. 3 having two batteries A and B the USE_A and USE_B control signals may be digital signals such that if USE_A is low and USE_B is high, use of Battery A is desired. If USE_A is high and USE_B is low, use of Battery B is desired. If USE_A is low and USE_B is low, use of Battery A and Battery B in parallel is desired. Finally, if USE_A is high and USE-B is high, use of neither Battery A nor Battery B is desired. These representative high and low signals for USE_A and USE_B is for illustrative purposes only as those skilled in the art will recognize that other combinations may also be chosen.

The fourth input terminal 380-4 may accept a charging current (ICHG) analog signal from the charger circuit 322 representative of the charging current provided to the batteries. The fifth input terminal 380-5 may accept an analog signal from the DC voltage source 204, e.g., the AC/DC adapter, (VAD) representative of the voltage level provided by the DC power source 204 at that particular time. The sixth input terminal 380-6 may accept an analog signal representative of the system supply voltage level (VSYS). The seventh 380-7 and eighth input terminals 380-8 may accept analog signals from Battery A (BATT_A) and Battery B (BATT_B) representative of the voltage level of each respective battery. Such BATT_A and BATT_B analog signals may be obtained by measuring the voltage at the positive pole of each respective battery. Finally, the ninth input terminal 380-9 represents a generic input terminal capable of receiving any other input control and data signals (AUXIN) considered not critical to the description of the present invention herein.

The first output terminal 382-1 may provide a switch control signal (PWR_AC) to switch SW1. The second output terminal 382-2 may provide a switch control signal (PWR_BATT) to switch SW2. The third output terminal 382-3 may provide a switch control signal (CHGA) to the charging switch SW3 for Battery A. The fourth output terminal 382-4 may provide a switch control signal (DCHA) to the discharging switch SW4 for Battery A. The fifth output terminal 382-5 may provide a digital DC source enable signal (ACAV) indicating the presence or absence of the DC Power source 204 having an output voltage greater than an acceptable threshold limit.

The sixth output terminal 382-6 may provide a digital data signal (ALERT) to notify other components, including at least the PMU 320, of a power crisis condition which will be later detailed herein. The seventh output terminal 382-7 may provide a digital data signal (CHGEN) to the charger which indicates if a charge enable condition has been reached. The eighth output terminal 382-8 may provide a switch control signal (CHGB) to the charging switch SW5 for Battery B. The ninth output terminal 382-9 may provide a switch control signal (DCHB) to the discharging switch SW6 for Battery B. Finally, the tenth output terminal 380-10 represents a generic output terminal capable of providing any other output control and data signals (AUXOUT) considered not critical to the description of the present invention herein.

The controller 315 accepts the above input data and control signals from the input terminals 380 of the selector circuit 314 and makes decisions about which power source or combination of sources (e.g., DC power source, Battery A, or Battery B) to select or deselect by controlling one or more combinations of switches SW1 to SW6. The controller 315 may also provides data and other control signals directly to the other output terminals, e.g, output terminals 382-5, 382-6, 382-7, and 382-10, for communication to other components of the power supply block 306.

The switch driver network 317 may include a plurality of switch drivers SD1, SD2, SD3, SD4, SD5, and SD6. Each of the switch drivers SD1, SD2, SD3, SD4, SD5, and SD6 may be further coupled to an associated switch SW1, SW2, SW3, SW4, SW5, and SW6 in order to drive each switch to ON and OFF positions as instructed by the controller 315 of the selector circuit 314.

Figure 4:
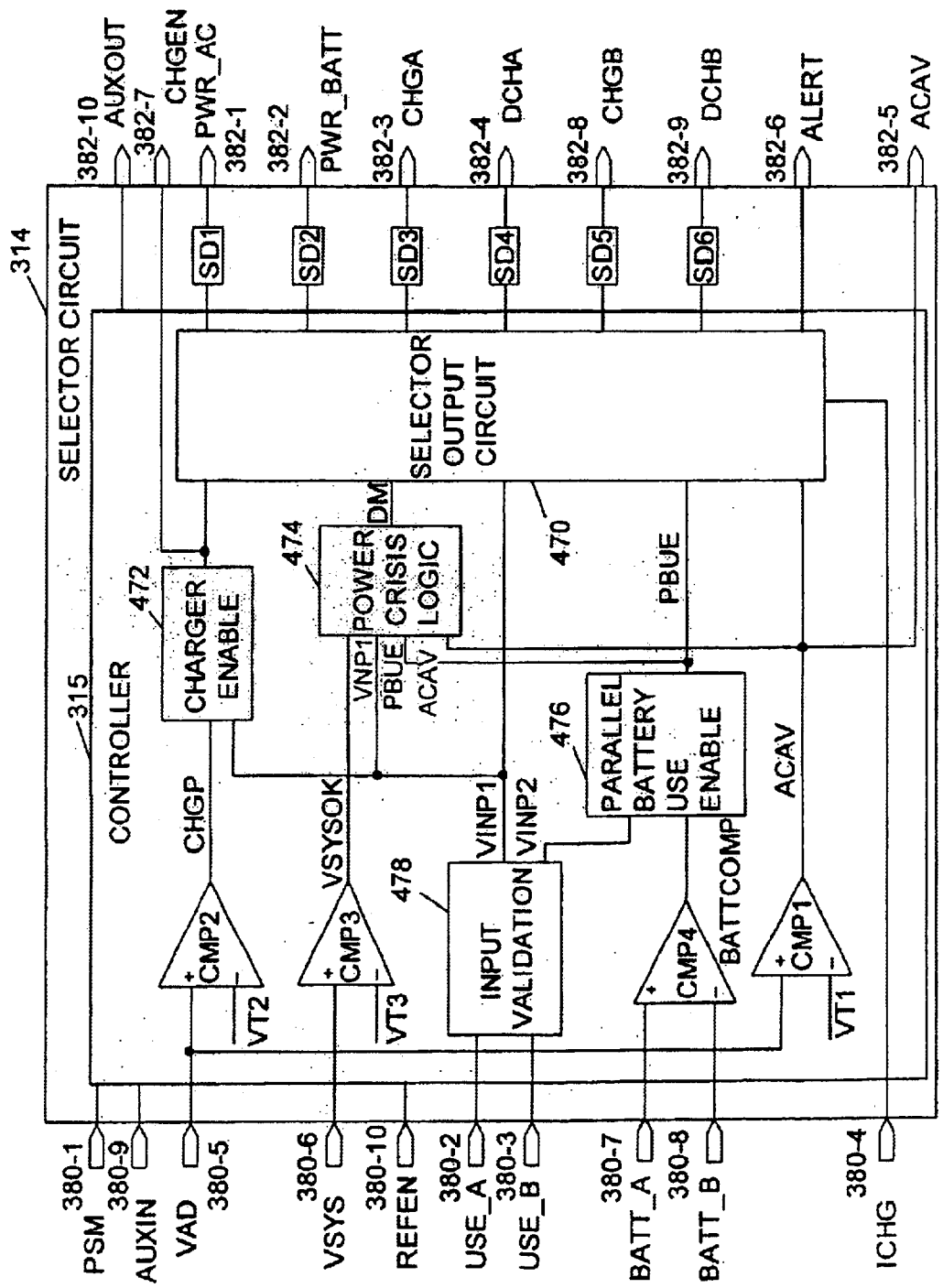
FIG. 4 is a more detailed block diagram of the selector circuit of FIG. 3 illustrating various components of the controller portion in more detail.

Turning to FIG. 4, a more detailed block diagram of the selector circuit 314, and in particular the controller 315 of the selector circuit 314 of FIG. 3 is illustrated. In general, the controller 315 may include a selector output circuit 470, a charge enable circuit 472, a parallel battery use enable circuit 476, an input validation circuit 478, a power crises circuit 474, and a plurality of comparators CMP1, CMP2, CMP3, and CMP4.

In general, the selector output circuit 470 may receive a variety of internal control signals such as a charge enable (CHGEN) signal from the charge enable circuit 472, a diode mode (DM) signal from the power crises circuit 474, a valid input signal (VINP1) from the input validation circuit 478, a parallel battery use enable (PBUE) signal from the parallel battery use enable circuit 476, and a DC source enable signal (ACAV) from comparator CMP1. The selector output circuit 470 may also receive an analog signal ICHG from the charger circuit 322 representative of the charging current. As further detailed herein, the selector output circuit 470 directs the switch driver network 317 to turn associated switches SW1, SW2, SW3, SW4, SW5, and SW6 ON and OFF depending on the state of various input signals.

The controller 315 may include a first comparator CMP1 configured to compare an analog signal representative of the voltage level of the DC source with a first threshold level VT1. The first threshold level VT1 is set higher than minimum supply voltage VT3 acceptable to the system. If the DC power source is present and has a supply voltage greater than the first threshold level VT1, the first comparator CMP1 provides a high ACAV control signal to the selector output circuit 470. Otherwise the first comparator provides a low ACAV signal The ACAV signal may also be provided to the power crisis circuit 474.

If the selector output circuit 470 receives a high ACAV signal from the first comparator CMP1, it will provide appropriate switch control signals to turn switch SW1 ON and turn switches SW2 to SW6 OFF (assuming the DC power source supply voltage is not greater than a second threshold level VT2 as further detailed below) such that power to the system 210 will be provided by the DC power source and no batteries will be recharged. The selector circuit 314 will utilize the DC power source in this instance irrespective of the USE_A and USE_B control signals from the PMU. As such, the selector circuit 314 can override a control signal from the PMU to use Battery A or Battery B and instead require power to the system 210 to be supplied by the DC power source whenever it is present and has a suitable voltage level greater than VT1. Advantageously, this feature prolongs battery life by ensuring use of the DC power source in appropriate circumstances.

To enable powering of the system 210 from the DC source and charging of one or more batteries, the charge enable (CHGEN) signal must be active. An active CHGEN signal in the present embodiment is a high CHGEN signal. The charge enable circuit 472 will provide a high CHGEN signal if it receives an appropriate CHGP signal from the second comparator CMP2, and an appropriate validation signal VINP1 from the input validation circuit 478. The second comparator CMP2 provides the appropriate CHGP signal if the supply voltage from the DC power source is greater than a second threshold level VT2, where VT2>VT1, and VT1>VT3. The input validation circuit 478 provides the validation signal VINP1. An appropriate validation signal VINP1 will be provided if the USE_A and USE_B control signals from the PMU assert the use of at least one of the Batteries A or B. An appropriate validation signal VINP1 will not be sent if the USE_A and USE_B control signals fail to assert the use of any of the Batteries A or B, e.g., if both USE_A and USE_B are high. The charge enable circuit 472 may also need other supplementary validation input signals (AUXIN) from the generic input terminal 380-9 in order to generate an active CHGEN signal.

During charging, the charging circuit 322 provides the ICHG signal to the selector circuit 314 that is representative of a charging current level. The selector circuit 314 accepts the ICHG signal at input terminal 380-4 and provides such signal to the selector output circuit 470. The selector output circuit 470 compares such ICHG signal with a charging threshold level signal ICHT. Based on this comparison, the selector output circuit 470 decides if the charging current level is high or low and turns various switches ON or OFF based on this and other input data as further detailed herein. A low charging current is represented by a low control signal and a high charging current is represented by a high control signal in the present embodiment as detailed in the table of FIG. 5.

The parallel battery use enable circuit 476 provides a parallel battery use enable (PBUE) signal to the selector output circuit 470. The selector output circuit 470 responds to a high PBUE signal by allowing parallel battery use, and responds to a low PBUE signal by not allowing parallel battery use despite a request from the PMU 320 via USE_A and USE_B signals indicating a desire for parallel battery use, e.g., USE_A and USE_B are low. As such, the selector circuit 314 provides additional precautions and protections against using Batteries A and B in parallel unless appropriate conditions are present.

For instance, the concern with using any two or more batteries, e.g., Battery A and Battery B, in parallel is that there is a relatively large difference in potential that creates an undesirable high current conditions when such batteries are connected in parallel. As such, a fourth comparator CMP4 of the controller 315 is configured to compare signals BATT_A and BATT_B. Such BATT_A and BATT_B signals may be analog signals taken from the positive terminal of Battery A and Battery B. If the difference between the two BATT_A and BATT_B signals is within a predefined limit, the comparator CMP4 will provide an active BATTCOMP signal to the parallel battery use enable circuit 476. In addition to receiving an active BATTCOMP signal from the fourth comparator CMP4, the parallel battery use enable circuit 476 should also receive an appropriate input validation signal VINP2 from the input validation circuit 478 to issue an active PBUE signal. An appropriate validation signal VINP2 will be provided if the USE_A and USE_B control signals assert the use of at the Batteries A and B in parallel, e.g., USE_A and USE_B are low.

If the USE_A and USE_B control signals from the PMU indicate parallel battery use is desired by the PMU, but the PBUE signal is not active because the voltage difference between Battery A and Battery B is not within the predetermined limit, the selector output circuit 474 will direct charging to the battery having the lower voltage level compared to the other. Under similar conditions, when no valid DC source is present, the selector output circuit will direct the battery with the higher voltage level compared to the other to provide discharging power to the system.

Advantageously, the selector circuit 314 may also include a power crises circuit 474 designed to independently monitor and identify power crises conditions, and provide an appropriate diode mode (DM) control signal to the selector output circuit 470 in case of a detected power crisis condition. The selector output circuit 470 is responsive to the appropriate DM control signal from the power crises circuit 474 to cause switch drivers from the switch driver network 317 to maintain switches SW2, SW4, and SW6 in an ON state, while maintaining switches SW1, SW3, and SW5 in an OFF state. As such, the power source with the highest voltage (Battery A, Battery B, or the DC power source) will supply the system though one of the diodes D1, D3, or D5 respectively in this diode mode. In addition, the selector circuit 314 will also provide an ALERT condition signal at output terminal 382-6 indicating a power crises condition. The ALERT signal could be provided to a number of components, including at least the PMU 320.

A power crises condition can include an invalid output or an invalid input. An invalid output can occur whenever the power source or sources that are supplying the system can not maintain the system voltage level at the minimum system threshold voltage level VT3. The system voltage level is compared with the minimum threshold voltage level VT3 by comparator CMP3 and a system check control signal VSYSOK is sent to the power crises circuit 474 based on this comparison. A low system voltage power crisis condition may occur if one or more of the power sources are willingly or accidentally disconnected.

An invalid input can also cause a power crises problem. An invalid input could be the PMU asserting through USE_A and USE_B signals a desired condition that would cause the system to lose power. For instance, the USE_A and USE_B signals may assert neither battery to be used (low VINP1 signal), e.g., USE_A and USE_B high, yet the DC power source is not available (low ACAV signal) or cannot keep the system at the minimum VT3 voltage level (low VSYSOK signal). Another invalid input situation may occur if the USE_A and USE_B signals from the PMU, although logically correct, would cause the system to lose power. For instance, the USE_A and USE_B signals may point to supply from one battery that is not present or accidentally removed. Use of such a battery would then cause the voltage level on the system to drop below the VT3 threshold and the VSYSOK signal indicative of this condition would be provided to the power crises circuit 374.

Due to power dissipation on diodes D1, D3, or D5 it is not suitable to maintain the DM supply mode for longer periods of time. Advantageously, the power crisis circuit 474 continuously monitors its input signals to deactivate is DM signal as soon as the power crises condition is remedied. Therefore, as soon as the power crises condition is remedied (e.g., a missing power source is coupled to the system) the internal DM signal from the power crisis circuit becomes inactive and a normal power supply mode is resumed.

Turning to FIG. 5, in conjunction with FIGS. 2 though 4, a table 500 illustrates respective switch states of switches SW1 to SW6 depending on various input signals to the selector circuit 314 and the selector output circuit 470. The table 500 illustrates various switch states when power to the system 210 is provided by the DC power source 204 and not the batteries 305. As such, the ACAV signal is high and the selector output circuit 470 sends appropriate switch control signals to the switch driver network 317 so SW1 is ON and SW2 is OFF as indicated in every column of table 500.

The CHGEN signal is "high" in every column of the table 500 except for the last column 522. As such, not only is the DC source present but the other conditions (the voltage from the DC source>VT2, and a proper input validation signal VINP1 is present) are satisfied to provide the high CHGEN signal. As such, charging is permitted in columns 502 to 520 of table 500.

In columns 502 and 504, the USE_A and USE_B signals are low and high respectively indicating the PMU's desire to use Battery A. As such, the switches SW5 and SW6 to Battery B are OFF in both instances. In column 502, the charging current signal is "low" indicating the charging current from the power conversion unit 226 to the batteries 305 is lower than a threshold charging current level ICHT. As such, the selector output circuit 470 is responsive to the charging current signal by sending appropriate control signals to the switch drive network 317 to turn SW3 ON and SW4 OFF. As such, charging current to Battery A flows through closed SW3 and the diode D4 in parallel with open SW4. Since the charging current is low, its flow through diode D4 will produce negligible power dissipation.

In contrast, the charging current in column 504 is high as indicated by a "high" charging current signal. As such, switches SW3 and SW4 are both ON. Therefore, no excess power is dissipated in diode D4 in this instance since the current flows through the closed switch SW4. Normally, at similar current levels switches SW1 to SW6, when in an ON state, dissipate less power than their corresponding parallel diodes D1 to D6. This difference is particularly important at high current levels.

Turning to columns 506 and 508, the USE_A and USE_B signals are high and low respectively indicating the PMU's desire to use Battery B. As such, the switches SW3 and SW4 to Battery A are OFF. Column 506, somewhat similarly to column 502, has a low charging current as represented by the low charging current signal. As such, switch SW5 is ON and SW6 is OFF. Charging current to Battery B therefore flows through closed switch SW5 and the diode D6 in parallel with open switch SW6. In contrast, the charging current in column 508 is high as represented by the high charging current signal. As such, switches SW5 and SW6 are ON such that no power is dissipated in diode D6 in this instance.

Turning to columns 510 to 520, the USE_A and USE_B signal are low and low respectively indicating the PMU's desire to use Battery A and Battery B in parallel. If the parallel battery use enable (PBUE) signal is high as indicated in columns 510 and 512, parallel charging of the Batteries A and B will be permitted. Switches SW3 to SW6 will all be ON if the charging current is high (charging current signal is high) as illustrated in column 512. Switches SW3 and SW5 will be ON and switches SW4 and SW6 will be OFF if the charging current is low (charging current signal is low) as illustrated in column 510.

If the USE_A and USE_B signals indicate the PMU's desire to use Battery A and Battery B in parallel, but the PBUE signal is low, the selector circuit 314 will not permit parallel battery operation thereby overriding the PMU's desired parallel operation. With all else being acceptable, the selector circuit 314 will permit charging of the battery with the lower voltage level. For instance, columns 514, 516 indicate Battery A has the lower voltage level. As such, switches SW5 and SW6 to Battery B are OFF. Switch SW3 to Battery A is ON in column 514 and switches SW3 and SW4 are ON in column 516. Similarly, if Battery B has the lower voltage level, switches SW3 and SW4 to Battery A will remain OFF as illustrated in columns 518 and 520. Switches SW5 and SW6 to Battery B will turn ON depending on the charging current level.

In contrast to power being supplied by the DC power source, power may be supplied by one or more of the batteries in various battery power system supply modes. In a battery supply mode, the selector circuit 314 instructs switch SW1 to be OFF and SW2 to be ON. The selector circuit 314 instructs a battery supply mode to be instituted if the DC source is not present, or the DC is present but does not have a voltage level above the first threshold VT1 as determined by comparator CMP1. As such, the ACAV signal from the first comparator CMP1 to the selector output circuit 470 would be low indicating a battery supply mode. When the ACAV signal is low, the selector output circuit 470 will instruct SW1 to switch OFF and SW2 to switch ON.

In the embodiment of FIG. 3, there are essentially two normal battery system supply modes. In normal battery system supply mode 1 (nbssm1), the USE_A and USE_B signals from the PMU point to use of only one Battery A or B, the targeted battery is present and can supply the system at least a voltage level to enable the system to have a voltage level greater the VT3 threshold level. In normal battery system supply mode 2 (nbssm2), the USE_A and USE_B signals point to the use of Batteries A and B in parallel, both batteries are present, both batteries can supply the system at least a voltage level to enable the system to have a voltage level greater the VT3 threshold level, and both batteries have a respective voltage level within a predetermined voltage range of one another.

Figure 6:
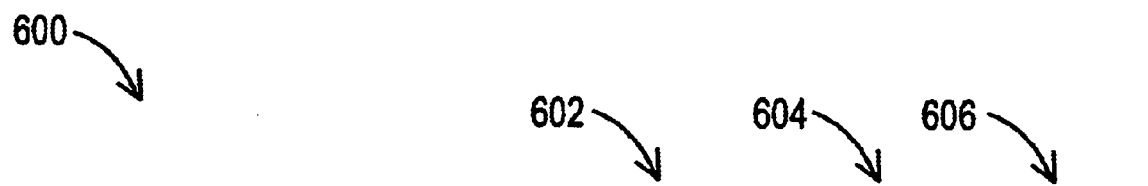
FIG. 6 is an exemplary table illustrating how the selector circuit drives various switches to ON and OFF states depending on various input signals when the device is powered by various combinations of batteries.

FIG. 6 illustrates a table 600 showing various input signals for both battery system supply modes nbssm1 and nbssm2 and the corresponding state of switches SW1 to SW6. As indicated earlier, since battery system supply mode is instituted, switch SW1 is OFF and SW2 is ON. Columns 602 and 604 of table 600 illustrate the first battery supply mode nbssm1 where use of Battery A (column 602) or Battery B (column 604) is targeted or desired. The input validation signals VINP1 and VINP2 should be at acceptable levels (VINP1 high and VINP2 low) in these instances. Therefore, if power is to be supplied by Battery A (column 602), switches SW3 and SW4 will be ON and switches SW5 and SW6 will be OFF. In contrast, if power is to be supplied by Battery B (column 604), switches SW5 and SW6 will be ON and switches SW3 and SW4 will be OFF.

In the second normal battery supply mode (nbssm2), BATTCOMP signal from the comparator CMP4 is high indicating the voltages of Batteries A and B are within an acceptable limit. The parallel battery use enable (PBUE) signal is also high indicating all other conditions (including high VINP2 signal) for parallel battery use as monitored by the parallel battery use enable circuit 476 are satisfactory. As such switches SW3 and SW4 coupled to Battery A are ON and switches SW5 and SW6 coupled to Battery B are ON.

Somewhat similar to the charging situation, if USE_A and USE_B signals indicate a desire to use both Batteries A and B in parallel, but the PBUE signal is not enabled (e.g., PBUE is low), the battery with the higher voltage level compared to the other will be selected to provide discharging power to the system. As such, the switch states will be like that in column 602 if Battery A has the higher voltage and like that in column 604 if Battery B has the higher voltage.

The PMU 320 may also send a power save mode request to the selector circuit 314 if a DC power source is absent and low power consumption is desired to conserve battery life. If such a power save mode request is received by the selector circuit 314, the controller 315 will direct switch SW1 to turn OFF, switch SW2 to turn OFF, switch SW3 to turn OFF, switch SW4 to turn ON, switch SW5 to turn OFF, and switch SW6 to turn ON. As such, Battery A or B with the higher voltage level will supply power via an associated diode D3 or D5 respectively. In addition, the selector circuits 314 own supply current will be highly reduced compared to normal operation contributing to overall device power savings in this power save mode.

Figure 7:
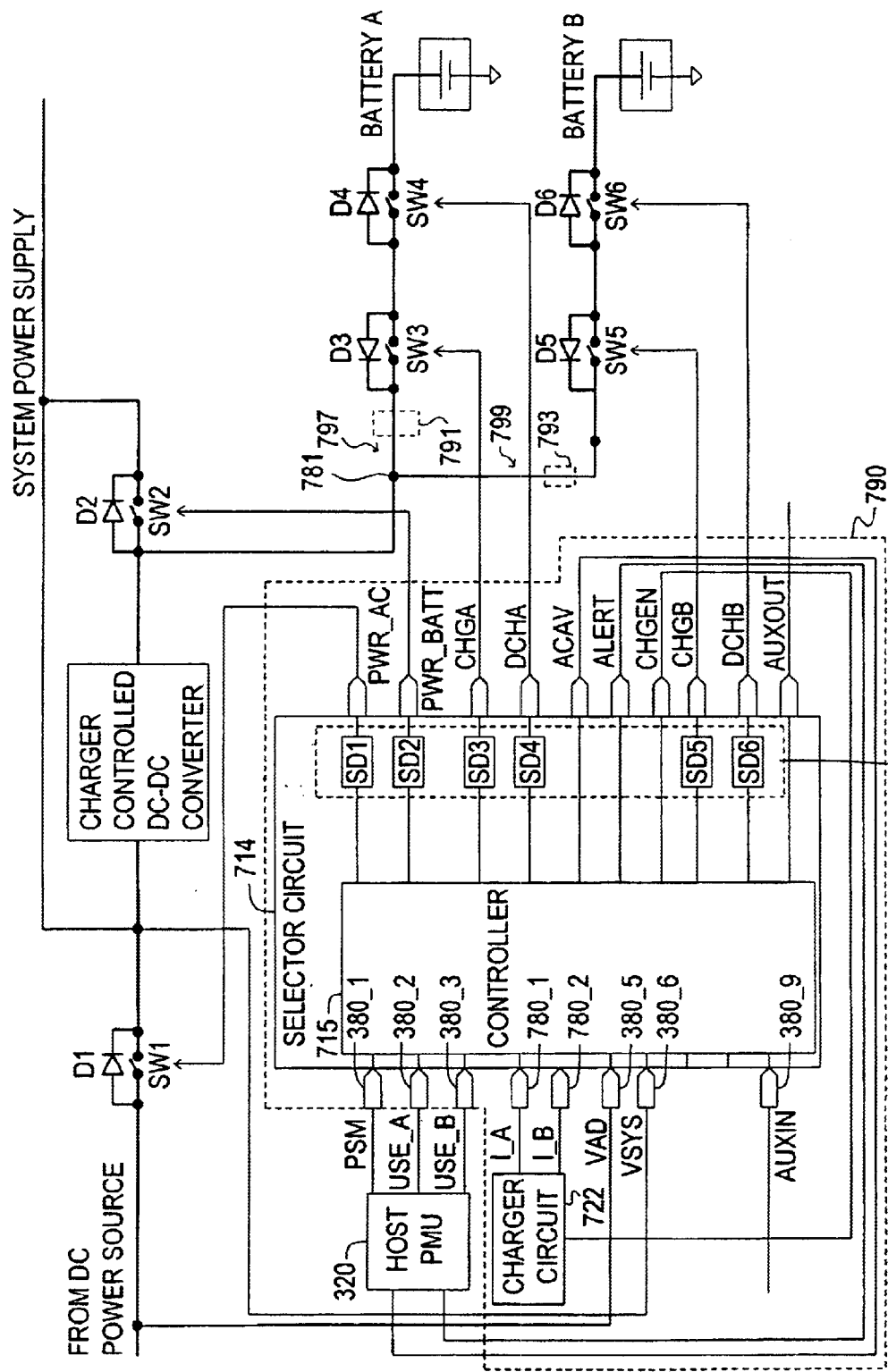
FIG. 7 is a block diagram of another exemplary embodiment of a selector circuit consistent with the invention having a controller configured to provide signals to select among a DC power source and a plurality of batteries via an associated switch driver network and associated switches.

FIG. 7 illustrates another embodiment of a selector circuit 714 consistent with the invention. The selector circuit 714 includes a controller 715 and a switch driver network 317. In general, the controller 715 provides control signals to the switch driver network 317 to drive the switches SW1, SW2, SW3, SW4, SW5, and SW6 ON or OFF thus selecting various power sources as further detailed herein. Like the embodiment of FIG. 3, the selector circuit 714 is configured to provide for safe operation of batteries in parallel. In general, the selector circuit 714 prevents coupling of batteries in parallel if undesirable conditions are present despite a parallel battery coupling request from the PMU 320. One undesirable condition may be one battery having a greater potential than the other battery such that undesirable inter battery current flow from the higher potential battery to the lower potential battery occurs.

Many elements of FIG. 7 are similar to that of FIG. 3 and, as such, are labeled similarly. Hence any repetitive description of similar elements that was already detailed with respect to FIG. 3 is omitted herein for clarity, and rather the differences between FIG. 3 and FIG. 7 are detailed. In general, both embodiments of FIGS. 3 and 7 make parallel coupling decisions based on differences in potential between each battery. The FIG. 3 embodiment does so by directly utilizing Batt_A and Batt_B voltage signals from each battery.

In contrast, the selector circuit 714 of FIG. 7 receives I_A and I_B signals representative of the current flow along path 797 and path 799 respectively. Path 797 is coupled between Battery A and node 781, and path 799 is coupled between Battery B and the same node 781. The current flow along paths 797, 797 may represent charging current to each battery or discharging current from each battery depending on the situation.

Such I_A and I_B signals may be input from the charger circuit 722. Alternatively, such I_A and I_B signals may be input directly from sensors 791, 793 designed to sense current along paths 797, 799 respectively. For instance, such sensors 791, 793 may be separate sense resistors. The selector circuit 714 has input terminals 780-1 and 780-2 to receive the I_A and I_B signals from any variety of sources. Such I_A and I_B signals may then be transferred to the controller 715 of the selector circuit 714.

Figure 8:
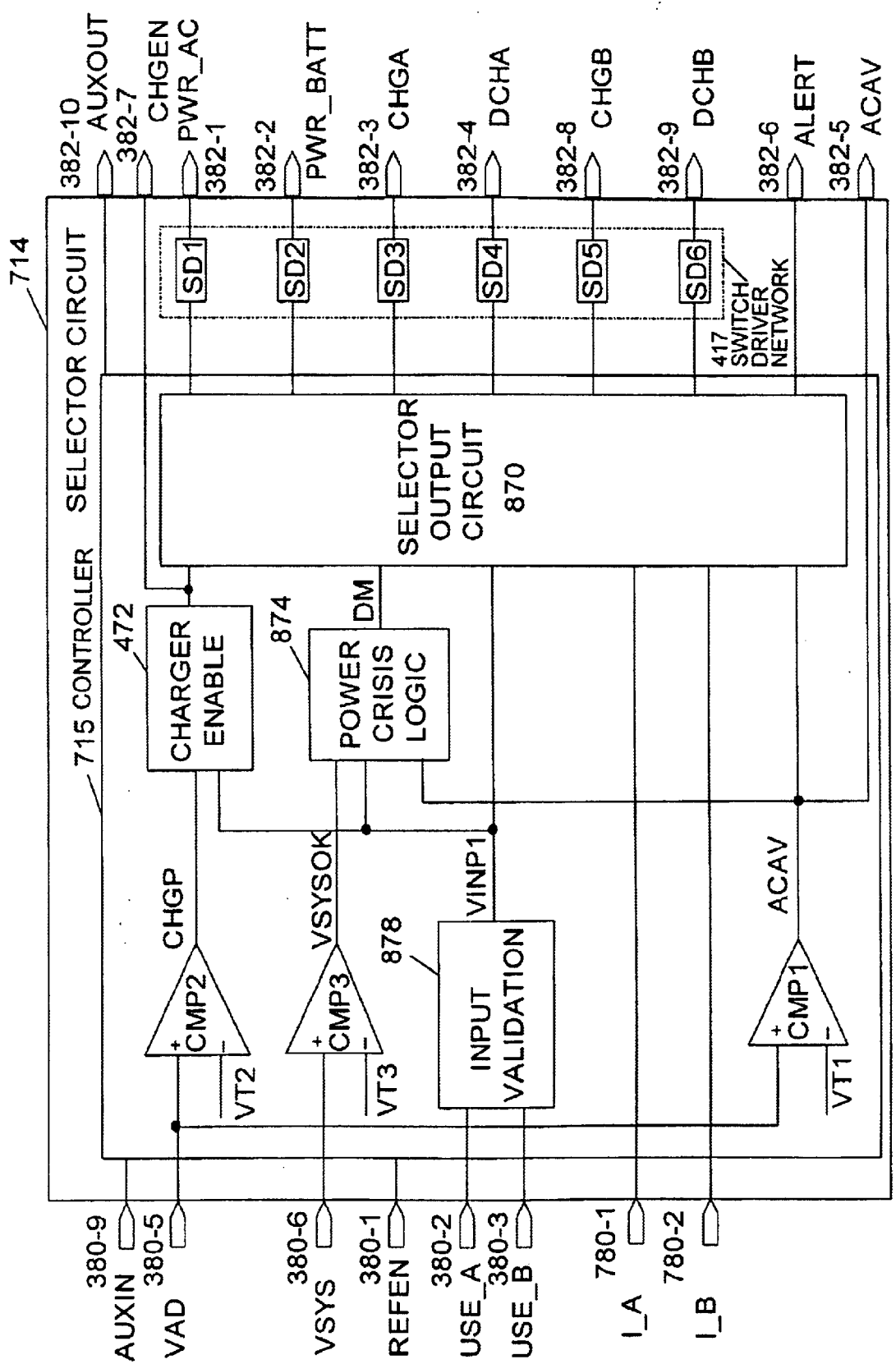
FIG. 8 is a more detailed block diagram of the selector circuit of FIG. 7 illustrating various components of the controller portion in more detail.

FIG. 8 illustrates a more detailed block diagram of the controller 715 of the selector circuit 714 of FIG. 7. Many elements of FIG. 8 are similar to that of FIG. 4 and, as such, are labeled similarly. Hence any repetitive description of similar elements is omitted herein for clarity and rather the differences between FIG. 4 and FIG. 8 are detailed. In particular, the comparator CMP4 and the parallel battery use circuit 476 (together with the associated BATTCOMP and PBUE signals) of FIG. 4 have been removed in selector circuit 714.

Instead, the selector circuit 714 receives the I_A and I_B signals at input terminals 780-1 and 780-2 as previously detailed and may then provide such signals to the selector output circuit 870 of the controller 715. The selector output circuit 870 compares such I_A and I_B signals with a current threshold level I_TH and makes switching decisions for switches SW3, SW4, SW5, and SW6 based on such comparisons as further detailed herein. The current threshold level I_TH may be the same for each battery. Alternatively, the current threshold level I_TH may be different for Battery A (I_THA) and for Battery B (I_THB). Those skilled in the art will recognize a variety of ways to make such a comparison between the I_A and I_B signals and the current threshold level I_TH or levels I_THA and I_THB. For example, the selector output circuit 870 may have one comparator that compares the I_A signal with an I_THA signal for Battery A and another comparator that compares the I_B signal an I_THB signal for Battery B.

The comparisons made by the selector output circuit 870 will provide a "low" or "high" battery current signal for each battery. A "low" current signal is representative of a current level flowing in the proper direction less than the associated threshold level or flowing in a direction opposite of the expected current flow. Current flowing in the opposite direction of expected current flow would be current flowing into the respective battery when the battery is supposed to deliver current (in discharge mode) or current flowing from the respective battery when the battery is supposed to receive current (in charge mode).

For example, if Battery A is in discharge mode the expected current flow direction is from Battery A to the system. A current from Battery A as indicated by the I_A signal less than an I_TH level would provide a "low" current control signal for Battery A. In addition, a current flow to Battery A regardless of its nominal level would also provide a "low" current control signal for Battery A. The charging circuit 722 may be able to provide I_A and I_B signals representative of current magnitude and direction to each battery. In addition, a variety of sensors 791, 793 known in the art may also be configured to provide current magnitude and direction directly to the selector circuit 714. For instance, if the sensors 791, 793 are sense resistors a positive voltage drop across a sense resistor may reveal a current flow in one direction while a negative voltage drop may reveal a current flow in the opposite direction.

The comparisons made by the selector output circuit 870 will provide a "high" current signal for each battery if the current flow is in the proper direction and greater than the associated I_TH level.

Once comparisons between current flow to or from each battery and respective threshold levels are made, the selector output circuit 870 sends appropriate command signals to the switch driver network 417. The switch driver network 417 is responsive to such command signals to drive switches SW3, SW4, SW5, and SW6 ON and OFF as detailed herein with reference to the tables of FIGS. 9 and 10 to provide protection against inter-battery current flow when batteries are coupled in parallel to the common node 781.

Figure 9:
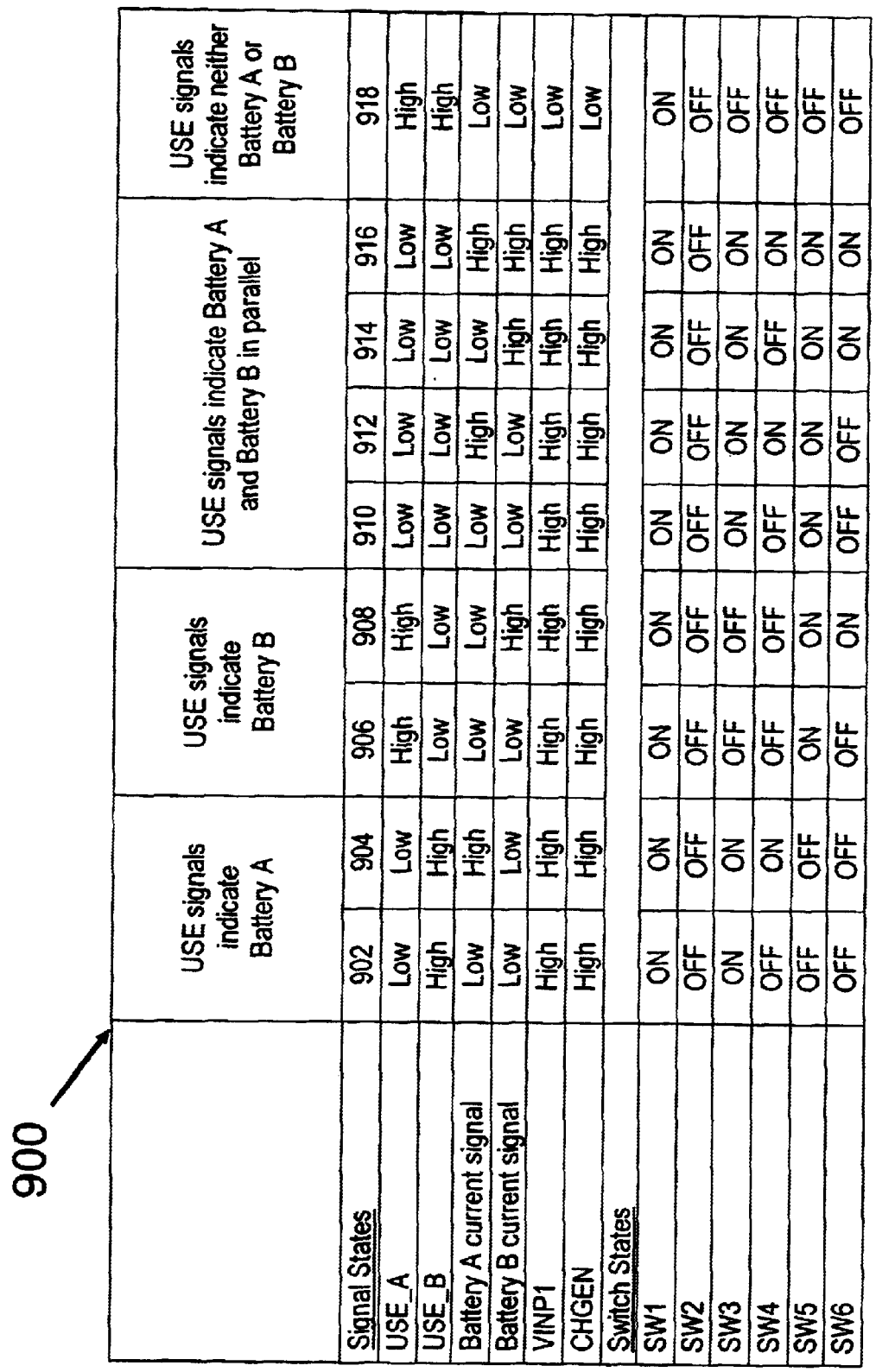
FIG. 9 is an exemplary table illustrating how the selector circuit of FIG. 7 drives various switches to ON and OFF states dependent on various input signals when the electronic device is powered by a DC power source.

Turning to FIG. 9, in conjunction with FIGS. 7 and 8, a table 900 illustrates respective switch states of switches SW1 to SW6 when power to the system is provided by a DC power source and not the batteries. Therefore, the ACAV signal from comparator CMP1 is high and the selector output circuit 870 instructs the switch driver network 417 to drive switch SW1 ON and switch SW2 OFF as detailed in every column of the table 900.

The CHGEN signal is "high" in every column of the table 900 except for the last column 918. As such, not only is the DC source present but other conditions (the voltage from the DC source>VT2, and a proper input validation signal VINP1 is present) are satisfied to provide the high CHGEN signal. Therefore, charging is permitted in columns 902 to 916 of table 900.

In columns 902 and 904 the USE_A and USE_B signals indicate the PMU's desire to use Battery A. As such, switches SW5 and SW6 to Battery B are OFF in both instances. Charging current is provided to Battery A via closed switch SW3 and diode D4 if the Battery A current signal, as provided by the selector output circuit 870, is "low" and via closed switches SW3 and SW4 if the Battery A current signal is "high."

In columns 906 and 908 the USE_A and USE_B signals indicated the PMU's desire to use Battery B. As such, switches SW3 and SW4 to Battery A are OFF in both instances. Charging current is provided to Battery B via closed switch SW5 and diode D6 if the Battery B current signal is "low" and via closed switches SW5 and SW6 if the Battery B current signal is "high."

In columns 910 through 916, the USE_A and USE_B signals indicate the PMU's desired to couple Battery A and B in parallel (for parallel charging in this instance). In column 910, the Battery A and Battery B current signals as provided by the selector output circuit 870 are "low." In response, the switch driver network 417 drives switch SW3 ON, SW4 OFF, SW5 ON, and SW6 OFF. As such, charging current to Battery A may flow through closed switch SW3 and diode D4 in parallel with open switch SW4. Similarly, charging current to Battery B may flow through closed switch SW5 and diode D6 in parallel with open switch SW6. In this instance, comparable current could flow to Battery A and B when their voltage levels are within a certain close range of one another. If the voltage levels are not within this close range of one another, a negligible current will flow towards the battery having the higher voltage, e.g., more than about 0.1 volts higher than the other in one instance.

In column 912 the Battery A current signal is "high" and the Battery B current signal is "low." Such a situation may indicate that the potential of Battery B is higher than the potential of Battery A and hence undesirable inter current flow is flowing from Battery B to Battery A. Since Battery B may be providing inter current to Battery A, the net current level to Battery B may be reduced below the threshold current level I_TH resulting in the "low" Battery B current signal. Advantageously, the selector circuit 714 is configured to open switch SW6 and close switch SW5 in this instance. Diode D6 is in reverse bias to Battery B thereby preventing undesirable inter current flow from Battery B to Battery A in this instance.

In column 914 the Battery A current signal is "low" and the Battery B current signal is "high." Accordingly, the selector circuit opens switch SW4 and closes switch SW3. Therefore, Battery A in this instance is prevented from providing inter current flow to Battery B by diode D4 in reverse bias to Battery A.

Column 916 represents a normal battery charge mode where both Battery A and B current signals are "high." The selector circuit therefore closes switches SW3, SW4, SW5, and SW6 to enable parallel charging of Batteries in this instance. The "high" Battery A and B control signals infers that the voltage levels of Battery A and B are within acceptable limits of one another hence no need to prevent inter battery flow is necessary. Of course, once the current flow to any one battery becomes to low the appropriate switches will open as in columns 912 and 914 to prevent cross conduction from the higher potential battery to the lower potential battery.

Figure 10:
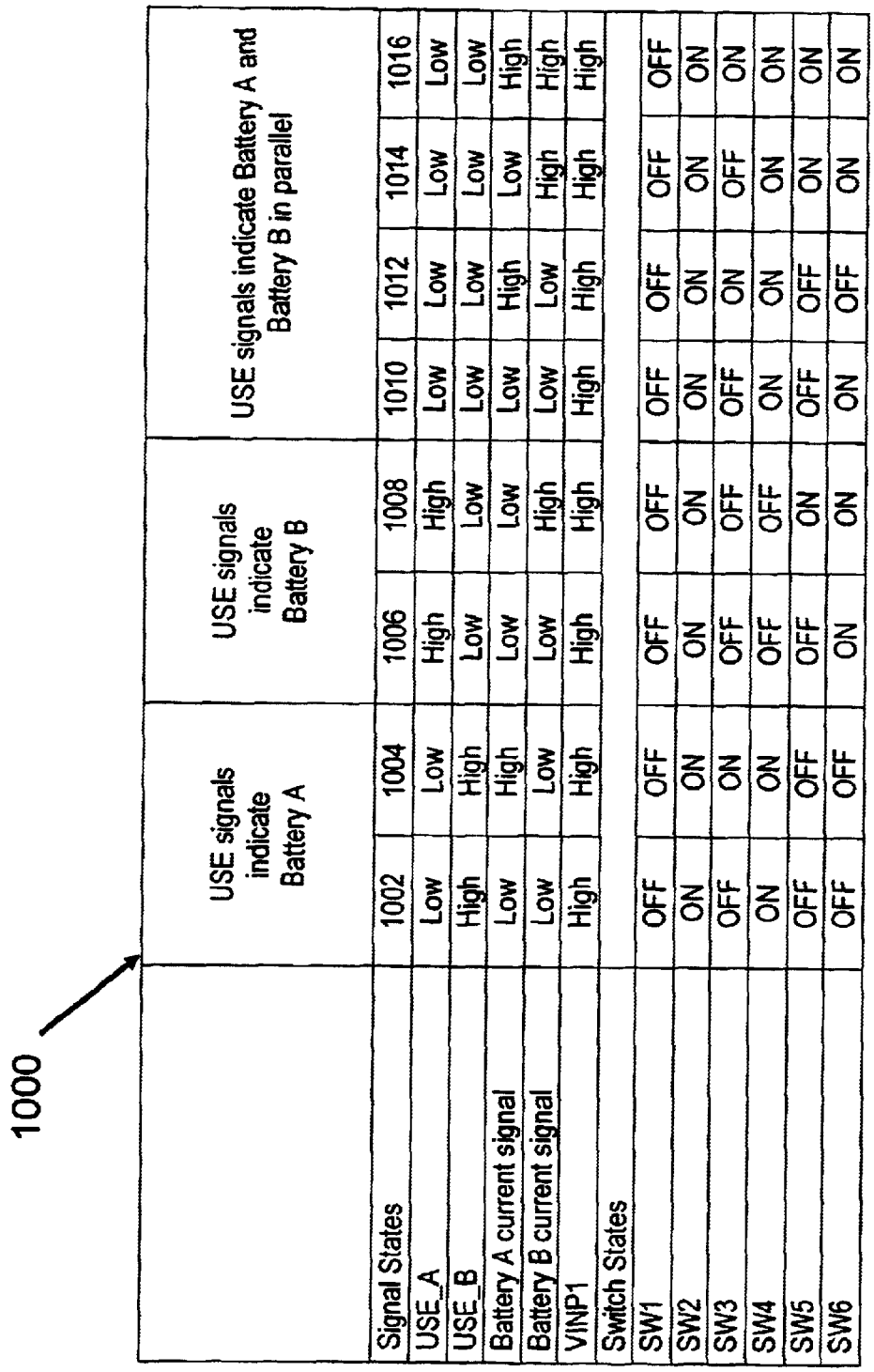
FIG. 10 is an exemplary table illustrating how the selector circuit of FIG. 7 drives various switches to ON and OFF states depending on various input signals when the device is powered by various combinations of batteries.

Turning to FIG. 10, in conjunction with FIGS. 7 and 8, a table 1000 illustrates respective switch states of switches SW1 to SW6 when some combination of batteries supplies power to the system.

In columns 1010 through 1016, the USE_A and USE_B signals indicate the PMU's desired to couple Battery A and B in parallel (for parallel discharging in this instance). In column 1010, the Battery A and Battery B current signals as provided by the selector output circuit 870 are both "low." In response, the switch driver network 417 drives switch SW3 OFF, SW4 ON, SW5 OFF, and SW6 ON. As such, this is a type of battery supply diode mode and the battery A or B with the higher voltage level will supply power to the system via diode D3 or D5 in this instance.

In column 1012 the Battery A current signal is "high" and the Battery B current signal is "low." Such a situation may indicate that the potential of Battery A is higher than the potential of Battery B and hence undesirable inter current flow is flowing from Battery A to Battery B. Since Battery A may be provided inter current to Battery B, the net current level from Battery B in this discharge mode may be reduced below the threshold current level I_TH resulting in the "low" Battery B current signal. Advantageously, the selector circuit 714 is configured to open switch SW5 and close switch SW6 in this instance. Diode D5 is in reverse bias to Battery A thereby preventing undesirable inter current flow from Battery A to Battery B in this instance. Battery B is still able to provide discharge current to the system through diode D5. However, if the output voltage of Battery B falls below a minimum output voltage level to direct bias diode D5, Battery B would then not be able to supply current to the system and the entire supply current to the system would be provided by Battery A.

In column 1014 the Battery A current signal is "low" and the Battery B current signal is "high." Accordingly, the selector circuit opens switch SW3 and closes switch SW4. Diode D3 is in reverse bias to Battery B thereby preventing undesirable inter current flow from Battery B to Battery A in this instance. Battery A is still able to provide discharge current to the system through diode D3. However, if the output voltage of Battery A falls below a minimum output voltage level to direct bias diode D3, Battery A would then not be able to supply current to the system and the entire supply current to the system would be provided by Battery B.

Column 1016 represents a normal battery discharge mode where both Battery A and B current signals are "high." The selector circuit therefore closes switches SW3, SW4, SW5, and SW6 to enable normal parallel discharging of Batteries A and B in this instance. The "high" Battery A and B control signals infers that the voltage levels of Battery A and B are within acceptable limits of one another hence no need to prevent inter battery flow is necessary. Of course, once the current flow to any one battery becomes too low the appropriate switches will open as in columns 1012 and 1014 to prevent cross conduction from the higher potential battery to the lower potential battery.

Turning to FIGS. 11A to 11C, yet a further example of the above detailed switching scheme of the selector circuit 714 is illustrated where Battery A and B are in a battery discharge mode. FIG. 11A illustrates normal parallel discharge operation of Batteries A and B. Battery A supplies current Ia along path 1197 via closed switches SW3 and SW4 and Battery B supplies current Ib to the system via closed switches SW5 and SW6 along path 1199. The Ia and Ib currents sum at node 1181 to provide a system current equal to the sum of Ia and Ib. As long as current Ia and Ib remain above respective threshold current levels, the selector circuit 714 maintains switches SW3, SW4, SW5, and SW6 ON as detailed in column 1016 of FIG. 10.

FIG. 11B represents an unacceptable cross conduction state where Battery B provides a current Ia to Battery A. This may occur if Battery A discharges much faster than Battery B. If all the switches SW3, SW4, SW5, and SW6 were to remain ON, gradually the current provided by Battery A would decrease. In addition, at a certain point in time, part of the current supplied by Battery B would be diverted and flow towards Battery A and eventually the net current would be to Battery A as opposed to from Battery A.

FIG. 11C illustrates how the internal logic of the selector circuit 714 avoids the undesirable case of FIG. 11B. The selector output circuit 870 of the selector circuit 714 drives switch SW3 OFF if the discharging current of Battery A falls below its associated threshold discharge current level (see column 1014 of FIG. 10). Therefore, Battery A is still able to supply current to the system through closed switch SW4 and diode D3 in parallel with open switch SW3. Advantageously, diode D3 is reversed bias with respect to Battery B to prevent cross conduction from Battery B to Battery A. In addition, if the output voltage of Battery A then falls below a minimum output voltage level to direct bias diode D3, Battery A would then not be able to supply current to the system and the entire supply current to the system would be provided by Battery B.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A power supply system comprising:
   a first path configured to be coupled to a first battery;
   a second path configured to be coupled to a second battery, said first path and said second path coupled to a common node;
   a first switch and a second switch coupled to said first path and configured to allow selective coupling of said first battery to a load for discharging said first battery;
   a third switch and a fourth switch coupled to said second path and configured to allow selective coupling of said second battery to said load for discharging said second battery; and
   a selector circuit configured to close said first, second, third, and fourth switch to allow discharging of said first battery and said second battery in parallel if a first discharge current level from said first battery is greater than a first discharge threshold level and a second discharge current level from said second battery is greater than a second discharge threshold level.

2. The power supply system of claim 1, wherein said first discharge threshold level is equal to said second discharge threshold level.

3. The power supply system of claim 1,
   wherein said first switch and second switch are further configured to allow selective coupling of said first battery to a DC power source for charging said first battery;
   wherein said third switch and said fourth switch are further configured to allow selective coupling of said second battery to said DC power source for charging said second battery; and
   wherein said selector circuit is further configured to close said first, second, third, and fourth switch to allow charging of said first battery and said second battery in parallel if a first charge current level to said first battery from said DC power source is greater than a first charge threshold level and a second charge current level to said second battery from said DC power source is greater than a second charge threshold level.

4. The power supply system of claim 3, wherein said first charge threshold level is equal to said second charge threshold level.

5. The power supply system of claim 1, further comprising a first diode in parallel with said first switch, a second diode in parallel with said second switch, a third diode in parallel with said third switch, and a fourth diode in parallel with said fourth switch.

6. The power supply system of claim 3, further comprising a first diode in parallel with said first switch, a second diode in parallel with said second switch, a third diode in parallel with said third switch, a fourth diode in parallel with said fourth switch.

7. The power supply system of claim 5, wherein said first diode is in reverse bias with said second battery and said selector circuit is further configured to open said first switch and close said second switch if said first discharge current level is less than said first discharge threshold level.

8. The power supply system of claim 6, wherein said second diode is in reverse bias with said first battery and said selector circuit is further configured to open said second switch and close said first switch if said first charge current level is less than said first charge threshold level.

9. The power supply system of claim 7, wherein said third diode is in reverse bias with said first battery and said selector circuit is further configured to open said third switch and close said fourth switch if said second discharge current level is less than said second discharge threshold level.

10. The power supply system of claim 8, wherein said fourth diode is in reverse bias with said second battery and said selector circuit is further configured to open said fourth switch and close said third switch if said second charge current level is less than said second charge threshold level.

11. An electronic device comprising:
a first path configured to be coupled to a first battery;
a second path configured to be coupled to a second battery, said first path and said second path coupled to a common node;
a first switch and a second switch coupled to said first path and configured to allow selective coupling of said first battery to a system of said electronic device for discharging said first battery;
a third switch and a fourth switch coupled to said second path and configured to allow selective coupling of said second battery to said system for discharging said second battery; and
a selector circuit configured to close said first, second, third, and fourth switch to allow discharging of said first battery and said second battery in parallel if a first discharge current level from said first battery is greater than a first discharge threshold level and a second discharge current level from said second battery is greater than a second discharge threshold level.

12. The electronic device of claim 11, wherein said first discharge threshold level is equal to said second discharge threshold level.

13. The electronic device of claim 11,
wherein said first switch and second switch are further configured to allow selective coupling of said first battery to a DC power source for charging said first battery;
wherein said third switch and said fourth switch are further configured to allow selective coupling of said second battery to said DC power source for charging said second battery; and
wherein said selector circuit is further configured to close said first, second, third, and fourth switch to allow charging of said first battery and said second battery in parallel if a first charge current level to said first battery from said DC power source is greater than a first charge threshold level and a second charge current level to said second battery from said DC power source is greater than a second charge threshold level.

14. The electronic device of claim 13, wherein said first charge threshold level is equal to said second charge threshold level.

15. The electronic device of claim 11, further comprising a first diode in parallel with said first switch, a second diode in parallel with said second switch, a third diode in parallel with said third switch, and a fourth diode in parallel with said fourth switch.

16. The electronic device of claim 13, further comprising a first diode in parallel with said first switch, a second diode in parallel with said second switch, a third diode in parallel with said third switch, a fourth diode in parallel with said fourth switch.

17. The electronic device of claim 15, wherein said first diode is in reverse bias with said second battery and said selector circuit is further configured to open said first switch and close said second switch if said first discharge current level is less than said first discharge threshold level.

18. The electronic device of claim 16, wherein said second diode is in reverse bias with said first battery and said selector circuit is further configured to open said second switch and close said first switch if said first charge current level is less than said first charge threshold level.

19. The electronic device of claim 17, wherein said third diode is in reverse bias with said first battery and said selector circuit is further configured to open said third switch and close said fourth switch if said second discharge current level is less than said second discharge threshold level.

20. The electronic device of claim 18, wherein said fourth diode is in reverse bias with said second battery and said selector circuit is further configured to open said fourth switch and close said third switch if said second charge current level is less than said second charge threshold level.

21. A method of ensuring safe operation of batteries in parallel, said method comprising:
receiving a control signal from an associated power management unit representative of a desired parallel coupling of at least a first battery and a second battery to a common node;
receiving a first current signal representative of a first current level along a first path coupled between said first battery and said common node;
receiving a second current signal representative of a second current level along a second path coupled between said second battery and said common node;
comparing said first current signal to a first threshold current level and said second current signal to a second threshold current level; and
coupling said first battery and second battery in parallel to said common node if said first current signal is greater than said first threshold current level and said second current signal is greater than said second threshold current level.

22. The method of claim 21, further comprising:
preventing discharge current flow from said first battery to said second battery if said second current signal is less than said second threshold current level.

23. The method of claim 21, further comprising:
preventing charging current flow from said first battery to said second battery if said first current signal is less than said first threshold current level.

* * * * *